United States Patent
Onovae et al.

(10) Patent No.: US 12,118,555 B2
(45) Date of Patent: Oct. 15, 2024

(54) SYSTEM, METHOD, AND COMPUTER PROGRAM PRODUCT FOR DYNAMIC AUTHORIZATION RESPONSE TIMEOUT

(71) Applicant: Visa International Service Association, San Francisco, CA (US)

(72) Inventors: Okeoghene Duke Onovae, Foster City, CA (US); Rajat Das, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 190 days.

(21) Appl. No.: 17/527,260

(22) Filed: Nov. 16, 2021

(65) Prior Publication Data

US 2023/0153816 A1    May 18, 2023

(51) Int. Cl.
*G06Q 20/20* (2012.01)
*G06Q 20/40* (2012.01)

(52) U.S. Cl.
CPC ......... *G06Q 20/4015* (2020.05); *G06Q 20/20* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 10,002,348 B1* | 6/2018 | Doctor | G06Q 20/401 |
| 11,048,569 B1* | 6/2021 | Seshadri | G06F 11/324 |
| 11,134,078 B2* | 9/2021 | Kukreja | H04L 63/104 |
| 2016/0034862 A1* | 2/2016 | Amos | G06Q 20/382 |
| | | | 705/39 |
| 2020/0143375 A1* | 5/2020 | Gurunathan | G06Q 20/409 |

* cited by examiner

*Primary Examiner* — David P Sharvin
(74) *Attorney, Agent, or Firm* — The Webb Law Firm

(57) ABSTRACT

Systems, methods, and computer program products may receive, from a merchant system, an authorization request associated with a transaction; communicate the authorization request to an issuer system and initiate a response timer associated with the transaction; in response to the response timer satisfying a predetermined response time amount without receiving, from the issuer system, an authorization response associated with the authorization request, determine an extended response time; and in response to receiving the authorization response from the issuer system before the response timer satisfies a sum of the extended response time amount and the predetermined response time amount, communicate, to the merchant system, the authorization response.

10 Claims, 5 Drawing Sheets

SYSTEM, METHOD, AND COMPUTER PROGRAM PRODUCT FOR DYNAMIC AUTHORIZATION RESPONSE TIMEOUT

BACKGROUND

1. Field

This disclosure relates to electronic payment networks and, in some non-limiting embodiments or aspects, to dynamic calculation of an authorization response timeout.

2. Technical Considerations

In a typical payment scenario, a card-based payment authorization may be routed to an issuer system by a payment network or transaction service provider system for an informed authorization decision. The issuer system may be expected to provide a response within a timeout threshold (e.g., typically 5 to 10 seconds, etc.). However, due to various issues, such as slow processing by an issuer host, network latency, and/or the like, an authorization response may not be received by the payment network within the timeout threshold. In such a timeout scenario, the payment network may respond on-behalf-of the issuer system using predetermined settings or rules associated with the issuer system. For example, the capability to respond on-behalf-of the issuer system under such a timeout scenario may be called Stand-In Processing (STIP). As an example, a payment network or transaction service provider system may respond on-behalf-of the issuer system due to issuer instructions and/or processing errors (e.g., incorrect transaction amount submitted by an acquirer, etc.).

A payment network or transaction service provider system providing STIP capabilities may monitor and ensure that each authorization request is responded to by the issuer within a set amount of time (e.g., within a timeout threshold, etc.), and if no response is received from the issuer system when the set amount of time expires, the payment network or transaction service provider system may respond in place of the issuer system.

SUMMARY

Accordingly, provided are improved systems, devices, products, apparatus, and/or methods for dynamic authorization response timeout.

According to some non-limiting embodiments or aspects, provided is a computer-implemented method, including: receiving, with at least one processor, from a merchant system, an authorization request associated with a transaction, wherein the authorization request includes transaction data associated with the transaction; communicating, with the at least one processor, the authorization request to an issuer system; in response to communicating the authorization request to the issuer system, initiating, with the at least one processor, a response timer associated with the transaction; in response to the response timer satisfying a predetermined response time amount without receiving, from the issuer system, an authorization response associated with the authorization request, determining, with the at least one processor, an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicating, with the at least one processor, to the merchant system, the authorization response, wherein the authorization response includes one of an authorization and a denial of the transaction.

In some non-limiting embodiments or aspects, the method further includes: in response to the response timer satisfying a sum of the extended response time amount and the predetermined response time amount before receiving the authorization response from the issuer system, performing, with the at least one processor, a stand-in processing operation by generating, based on the transaction data and at least one rule associated with the issuer system, a stand-in response and communicating, to the merchant system, the stand-in response, wherein the stand-in response includes one of the authorization and the denial of the transaction.

In some non-limiting embodiments or aspects, the method further includes: in response to receiving, from the issuer system, the authorization response associated with the authorization request before the response timer satisfies the predetermined response time amount, communicating, with the at least one processor, the authorization response to the merchant system.

In some non-limiting embodiments or aspects, the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

In some non-limiting embodiments or aspects, the historical transaction data includes a processing time of at least one historical authorization request at the issuer system for the at least one historical transaction.

In some non-limiting embodiments or aspects, the method further includes: before determining the extended response time amount, verifying, with the at least one processor, that the issuer system is eligible for an extended response time.

In some non-limiting embodiments or aspects, a sum of the predetermined response time amount and the extended response time amount is less than a time amount of a merchant timeout in response to expiration of which the merchant system cancels the transaction.

According to some non-limiting embodiments or aspects, provided is a system, including: at least one processor programmed and/or configured to: receive, from a merchant system, an authorization request associated with a transaction, wherein the authorization request includes transaction data associated with the transaction; communicate the authorization request to an issuer system; in response to communicating the authorization request to the issuer system, initiate a response timer associated with the transaction; in response to the response timer satisfying a predetermined response time amount without receiving, from the issuer system, an authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicate, to the merchant system, the authorization response, wherein the authorization response includes one of an authorization and a denial of the transaction.

In some non-limiting embodiments or aspects, the at least one processor is further programmed and/or configured to: in response to the response timer satisfying a sum of the extended response time amount and the predetermined response time amount before receiving the authorization response from the issuer system, perform a stand-in processing operation by generating, based on the transaction data and at least one rule associated with the issuer system, a stand-in response and communicating, to the merchant system, the stand-in response, wherein the stand-in response includes one of the authorization and the denial of the transaction.

In some non-limiting embodiments or aspects, the at least one processor is further programmed and/or configured to: in response to receiving, from the issuer system, the authorization response associated with the authorization request before the response timer satisfies the predetermined response time amount, communicate the authorization response to the merchant system.

In some non-limiting embodiments or aspects, the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

In some non-limiting embodiments or aspects, the historical transaction data includes a processing time of at least one historical authorization request at the issuer system for the at least one historical transaction.

In some non-limiting embodiments or aspects, the at least one processor is further programmed and/or configured to: before determining the extended response time amount, verify that the issuer system is eligible for an extended response time.

In some non-limiting embodiments or aspects, a sum of the predetermined response time amount and the extended response time amount is less than a time amount of a merchant timeout in response to expiration of which the merchant system cancels the transaction.

According to some non-limiting embodiments or aspects, provided is a computer program product comprising at least one non-transitory computer-readable medium including program instructions that, when executed by at least one processor, cause the at least one processor to: receive, from a merchant system, an authorization request associated with a transaction, wherein the authorization request includes transaction data associated with the transaction; communicate the authorization request to an issuer system; in response to communicating the authorization request to the issuer system, initiate a response timer associated with the transaction; in response to the response timer satisfying a predetermined response time amount without receiving, from the issuer system, an authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicate, to the merchant system, the authorization response, wherein the authorization response includes one of an authorization and a denial of the transaction.

In some non-limiting embodiments or aspects, the program instructions, when executed by the at least one processor, further cause the at least one processor to: in response to the response timer satisfying a sum of the extended response time amount and the predetermined response time amount before receiving the authorization response from the issuer system, perform a stand-in processing operation by generating, based on the transaction data and at least one rule associated with the issuer system, a stand-in response and communicating, to the merchant system, the stand-in response, wherein the stand-in response includes one of the authorization and the denial of the transaction.

In some non-limiting embodiments or aspects, the program instructions, when executed by the at least one processor, further cause the at least one processor to: in response to receiving, from the issuer system, the authorization response associated with the authorization request before the response timer satisfies the predetermined response time amount, communicate the authorization response to the merchant system.

In some non-limiting embodiments or aspects, the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

In some non-limiting embodiments or aspects, the historical transaction data includes a processing time of at least one historical authorization request at the issuer system for the at least one historical transaction.

In some non-limiting embodiments or aspects, a sum of the predetermined response time amount and the extended response time amount is less than a time amount of a merchant timeout in response to expiration of which the merchant system cancels the transaction.

Further non-limiting embodiments or aspects are set forth in the following numbered clauses:

Clause 1. A computer-implemented method, comprising: receiving, with at least one processor, from a merchant system, an authorization request associated with a transaction, wherein the authorization request includes transaction data associated with the transaction; communicating, with the at least one processor, the authorization request to an issuer system; in response to communicating the authorization request to the issuer system, initiating, with the at least one processor, a response timer associated with the transaction; in response to the response timer satisfying a predetermined response time amount without receiving, from the issuer system, an authorization response associated with the authorization request, determining, with the at least one processor, an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicating, with the at least one processor, to the merchant system, the authorization response, wherein the authorization response includes one of an authorization and a denial of the transaction.

Clause 2. The computer-implemented method of clause 1, further comprising: in response to the response timer satisfying a sum of the extended response time amount and the predetermined response time amount before receiving the authorization response from the issuer system, performing, with the at least one processor, a stand-in processing operation by generating, based on the transaction data and at least one rule associated with the issuer system, a stand-in response and communicating, to the merchant system, the stand-in response, wherein the stand-in response includes one of the authorization and the denial of the transaction.

Clause 3. The computer-implemented method of clauses 1 or 2, further comprising: in response to receiving, from the issuer system, the authorization response associated with the authorization request before the response timer satisfies the predetermined response time amount, communicating, with the at least one processor, the authorization response to the merchant system.

Clause 4. The computer-implemented method of any of clauses 1-3, wherein the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

Clause 5. The computer-implemented method of any of clauses 1-4, wherein the historical transaction data includes a processing time of at least one historical authorization request at the issuer system for the at least one historical transaction.

Clause 6. The computer-implemented method of any of clauses 1-5, further comprising: before determining the extended response time amount, verifying, with the at least one processor, that the issuer system is eligible for an extended response time.

Clause 7. The computer-implemented method of any of clauses 1-6, wherein a sum of the predetermined response time amount and the extended response time amount is less than a time amount of a merchant timeout in response to expiration of which the merchant system cancels the transaction.

Clause 8. A system, comprising: at least one processor programmed and/or configured to: receive, from a merchant system, an authorization request associated with a transaction, wherein the authorization request includes transaction data associated with the transaction; communicate the authorization request to an issuer system; in response to communicating the authorization request to the issuer system, initiate a response timer associated with the transaction; in response to the response timer satisfying a predetermined response time amount without receiving, from the issuer system, an authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicate, to the merchant system, the authorization response, wherein the authorization response includes one of an authorization and a denial of the transaction.

Clause 9. The system of clause 8, wherein the at least one processor is further programmed and/or configured to: in response to the response timer satisfying a sum of the extended response time amount and the predetermined response time amount before receiving the authorization response from the issuer system, perform a stand-in processing operation by generating, based on the transaction data and at least one rule associated with the issuer system, a stand-in response and communicating, to the merchant system, the stand-in response, wherein the stand-in response includes one of the authorization and the denial of the transaction.

Clause 10. The system of clauses 8 or 9, wherein the at least one processor is further programmed and/or configured to: in response to receiving, from the issuer system, the authorization response associated with the authorization request before the response timer satisfies the predetermined response time amount, communicate the authorization response to the merchant system.

Clause 11. The system of any of clauses 8-10, wherein the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

Clause 12. The system of any of clauses 8-11, wherein the historical transaction data includes a processing time of at least one historical authorization request at the issuer system for the at least one historical transaction.

Clause 13. The system of any of clauses 8-12, wherein the at least one processor is further programmed and/or configured to: before determining the extended response time amount, verify that the issuer system is eligible for an extended response time.

Clause 14. The system of any of clauses 8-13, wherein a sum of the predetermined response time amount and the extended response time amount is less than a time amount of a merchant timeout in response to expiration of which the merchant system cancels the transaction.

Clause 15. A computer program product comprising at least one non-transitory computer-readable medium including program instructions that, when executed by at least one processor, cause the at least one processor to: receive, from a merchant system, an authorization request associated with a transaction, wherein the authorization request includes transaction data associated with the transaction; communicate the authorization request to an issuer system; in response to communicating the authorization request to the issuer system, initiate a response timer associated with the transaction; in response to the response timer satisfying a predetermined response time amount without receiving, from the issuer system, an authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicate, to the merchant system, the authorization response, wherein the authorization response includes one of an authorization and a denial of the transaction.

Clause 16. The computer program product of clause 15, wherein the program instructions, when executed by the at least one processor, further cause the at least one processor to: in response to the response timer satisfying a sum of the extended response time amount and the predetermined response time amount before receiving the authorization response from the issuer system, perform a stand-in processing operation by generating, based on the transaction data and at least one rule associated with the issuer system, a stand-in response and communicating, to the merchant system, the stand-in response, wherein the stand-in response includes one of the authorization and the denial of the transaction.

Clause 17. The computer program product of clauses 15 or 16, wherein the program instructions, when executed by the at least one processor, further cause the at least one processor to: in response to receiving, from the issuer system, the authorization response associated with the authorization request before the response timer satisfies the predetermined response time amount, communicate the authorization response to the merchant system.

Clause 18. The computer program product of any of clauses 15-17, wherein the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

Clause 19. The computer program product of any of clauses 15-18, wherein the historical transaction data includes a processing time of at least one historical authorization request at the issuer system for the at least one historical transaction.

Clause 20. The computer program product of any of clauses 15-19, wherein a sum of the predetermined response time amount and the extended response time amount is less than a time amount of a merchant timeout in response to expiration of which the merchant system cancels the transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
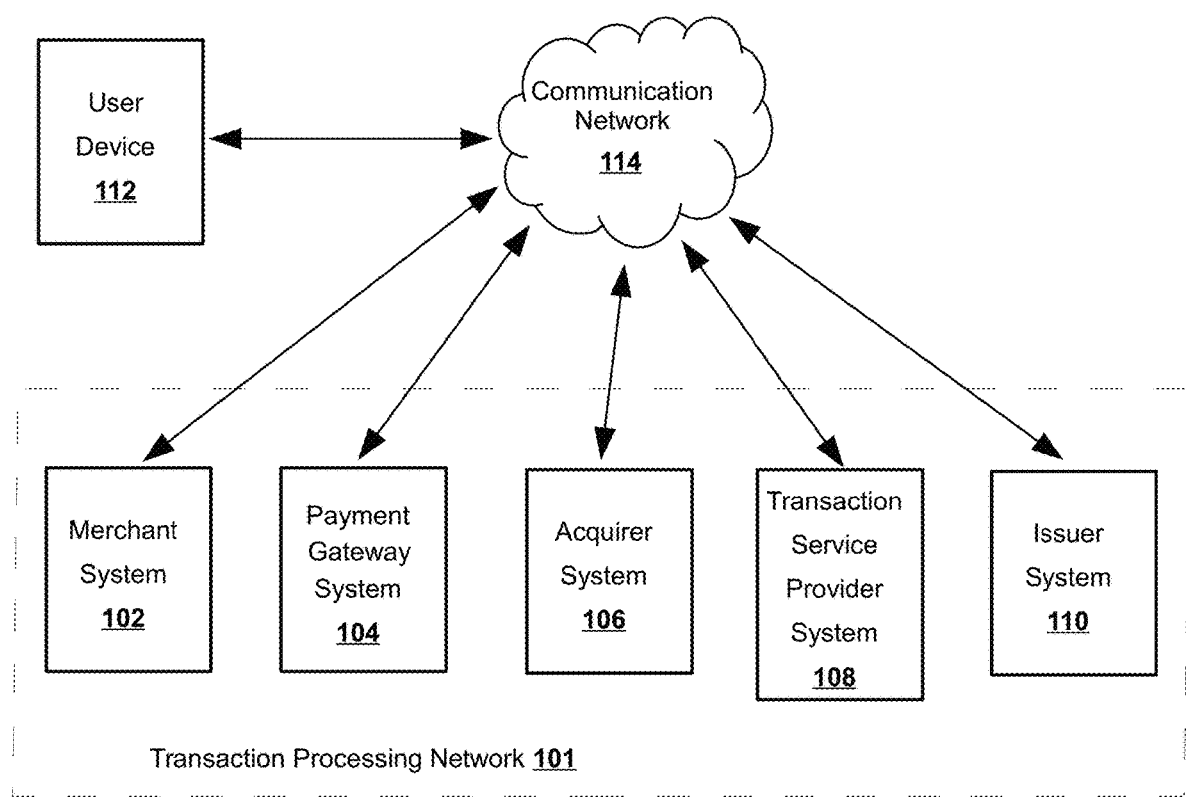
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g., customers) based on a transaction (e.g., a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

As previously described, a payment network or transaction service provider system providing Stand-In Processing (STIP) capabilities may monitor and ensure that each authorization request is responded to by an issuer within a set amount of time (e.g., within a timeout threshold, etc.), and if no response is received from the issuer system when the set amount of time expires, the payment network or transaction service provider system may respond in place of the issuer system (e.g., generate and provide an authorization response to a merchant system on behalf of the issuer system, etc.). Table 1 below shows example maximum timeout thresholds for an issuer system to respond to an authorization request for different regions and different transaction types.

TABLE 1

| Transaction Type | AP, Canda, CEMEA, and LAC Regions | Europe Region | U.S. Region |
|---|---|---|---|
| POS (including PIN at POS and Unattended Cardholder-Activated Terminals where PIN is present) | 15 seconds | 5 seconds | 10 seconds |
| ATM Cash Disbursement (MCC 6011 only) | 30 seconds | 5 seconds | 25 seconds |

Because communications for processing a transaction take a finite amount of time to travel from a transaction service provider system to an acquirer system (and back to a merchant system), the acquirer system and/or merchant system may typically wait for a longer period of time before timeout than the transaction processing system to account for network travel time. In addition, due to variability of STIP timeout thresholds in different regions, acquirer systems and/or merchant systems may typically wait for the maximum value across each region. Although there may be no standard, acquirer systems may typically wait for a timeout period of 25 seconds or more at POS terminals or 35 seconds or more at ATM terminals for a response from the transaction service provider system. If a response is not received (e.g., due to network congestion between the transaction service provider system and the acquirer system, etc.), the merchant system may request an alternate form of payment and/or cancel the transaction. For example, a merchant system or terminal may use a timeout of 120 seconds (e.g., for local integration, etc.) or 150 seconds (e.g., for cloud integration, etc.).

The definitions of the parameters provided in Table 2 below are referred to hereinafter for determining transit times and processing times associated with authorization requests and authorization responses.

TABLE 2

Transit time related symbols (in seconds)

| | |
|---|---|
| $t_{MA}$ | Network Travel time between Merchant to Acquirer (either direction) |
| $t_{AV}$ | Network Travel time between Acquirer to TSP (either direction) |
| $t_{VT}$ | Network Travel time between TSP to Issuer (either direction) |

Processing time related symbols

| | |
|---|---|
| $t_A$ | Processing time at Acquirer (both for request and response) |
| $t_V$ | Processing time at TSP (both for request and response) |
| $t_I$ | Processing time at Issuer (both for request and response) |
| $t_{TO}$ | STIP Timeout value for this Issuer |

Let $t_0$ equal a time at which an authorization request is originated at a merchant system or terminal, and $t_R$ equal a time at which an authorization response is received by the merchant system or terminal. In a normal processing scenario (e.g., in which an authorization response is received from the issuer system, etc.), a total transit and processing time $t_R - t_0$ for a transaction may be defined according to the following Equation (1):

$$t_R - t_0 = t_{MA} + t_A + t_{AV} + t_V + t_{VT} + t_I + t_{VT} + t_V + t_{AV} + t_A + t_{MA} \quad (1)$$

For example, a total transit and processing time $t_R - t_0$ for a transaction may be equal to (a transit time of an authorization request from the merchant system to the acquirer system)+(a processing time of the authorization request at the acquirer system)+(a transit time of the authorization request from the acquirer system to the transaction service provider (TSP) system)+(a processing time of the authorization request at the TSP system)+(a transit time of the authorization request from the TSP system to the issuer system)+(a processing time of the authorization request at the issuer system)+(a transit time of an authorization response from the issuer system to the TSP system)+(a processing time of the authorization response at the TSP system)+(a transit time of the authorization response from the TSP system to the acquirer system)+(a processing time of the authorization response at the acquirer system)+(a transit time from the acquirer system to the merchant system or terminal). As an example, Equation (1) may be rewritten as the following Equation (2):

$$t_R - t_0 = 2t_{MA} + 2t_A + 2t_{AV} + 2t_V + 2t_{VT} + t_I \quad (2)$$

Some benchmarking data indicates that a typical chip card transaction (e.g., an EMV chip card transaction, etc.) takes two seconds for a round trip. Other benchmarking data puts the average time at somewhere between eight to thirteen seconds; however, it is noted that processing time has improved considerably since this benchmark was performed. Accordingly, assuming that a total transit and processing time $t_R - t_0$ for a transaction is about ten seconds, Equation (2) may be rewritten as the following Equation (3):

$$10 \approx 2t_{MA} + 2t_A + 2t_{AV} + 2t_V + 2t_{VT} + t_I \quad (3)$$

Accordingly, assuming that $t_{VT}$ and $t_I$ are zero or close to zero, Equation (3) may be rewritten as the following Equation (4):

$$10 \approx 2t_{MA} + 2t_A + 2t_{AV} + 2t_V \quad (4)$$

In a STIP scenario (e.g., in which an authorization response is not received from the issuer system, in which the TSP system performs STIP, etc.) a total transit and processing time STIP($t_R - t_0$) for a transaction in which STIP is invoked may be defined according to the following Equation (5):

$$\text{STIP}(t_R - t_0) = t_{MA} + t_A + t_{AV} + t_V + t_{TO} + t_V + t_{AV} + t_A + t_{MA} \quad (5)$$

For example, a total transit and processing time STIP($t_R - t_0$) for a transaction in which STIP is invoked may be equal to (a transit time of an authorization request from the merchant system to the acquirer system)+(a processing time of the authorization request at the acquirer system)+(a transit time of the authorization request from the acquirer system to the transaction service provider (TSP) system)+(a processing time of the authorization request at the TSP system)+(a timeout time associated with the issuer system)+(a STIP processing time at the TSP system)+(a transit time of an authorization response from the TSP system to the acquirer system)+(a processing time of the authorization response at the acquirer system)+(a transit time from the acquirer system to the merchant system or terminal). As an example, Equation (5) may be rewritten as the following Equation (6):

$$\text{STIP}(t_R - t_0) = 2t_{MA} + 2t_A + 2t_{AV} + 2t_V + t_{TO} \quad (6)$$

Using Equation (3), in which a total transit and processing time $t_R - t_0$ for a transaction is assumed to be about ten seconds, the total transit and processing time STIP($t_R - t_0$) for a transaction in which STIP is invoked may be defined according to the following Equation (7):

$$\text{STIP}(t_R - t_0) < 10 + t_{TO} \quad (7)$$

For example, a total transit and processing time STIP($t_R - t_0$) for a transaction in which STIP is invoked may be equal to the average transit and processing time of a normal transaction (e.g., 10 seconds, etc.) plus the timeout time associated with the issuer system.

To successfully send a response back to the merchant system or terminal before the merchant system or terminal times out (e.g., requests an alternate form of payment and/or cancels the transaction, etc.), a maximum total transit and processing time MAX($t_R - t_0$) should be less than a timeout time of the merchant system or terminal. For example, assuming the example merchant timeout time of 120 seconds described herein above, the maximum total transit and processing time MAX($t_R - t_0$) may be defined according to the following Equation (8):

$$\text{MAX}(t_R - t_0) <= 120 \quad (8)$$

Accordingly, as long as STIP($t_R - t_0$) is less than or equal to MAX($t_R - t_0$), the transaction may be successfully processed (either normally or using STIP). It is noted that, for ease of discussion, a timeout time of the acquirer system is assumed to be aligned with the timeout time of the merchant system or terminal, less than the transit time of the authorization request from the merchant system or terminal to the acquirer system. In this way, a relationship of STIP($t_R - t_0$) to MAX($t_R - t_0$) for a successfully processed transaction may be defined according to the following Equation (9):

$$\text{STIP}(t_R - t_0) < \text{MAX}(t_R - t_0) \quad (9)$$

Using Equations (7) and (8), a transaction may be successfully processed during timeout under the example merchant timeout time of 120 seconds described herein above when 10 plus $t_{TO}$ is less than or equal to 120, which may be defined according to the following Equation (10):

$$t_{TO} <= 110 \quad (10)$$

Accordingly, as long as $t_{TO}$ is less than 110 seconds (for this example scenario), the transaction may be successfully processed. Although Equations (1)-(10) are described with respect to an example scenario in which a total transit and processing time $t_R$-$t_0$ for a transaction is about ten seconds and a merchant timeout time is 120 seconds, non-limiting embodiments or aspects of the present disclosure are not limited thereto and may be applied to any total transit and processing time $t_R$-$t_0$ for a transaction and/or any merchant timeout. For example, Equation (9) is a generalized statement, and Equation (10) is a specific instance of Equation (5).

Figure 5:
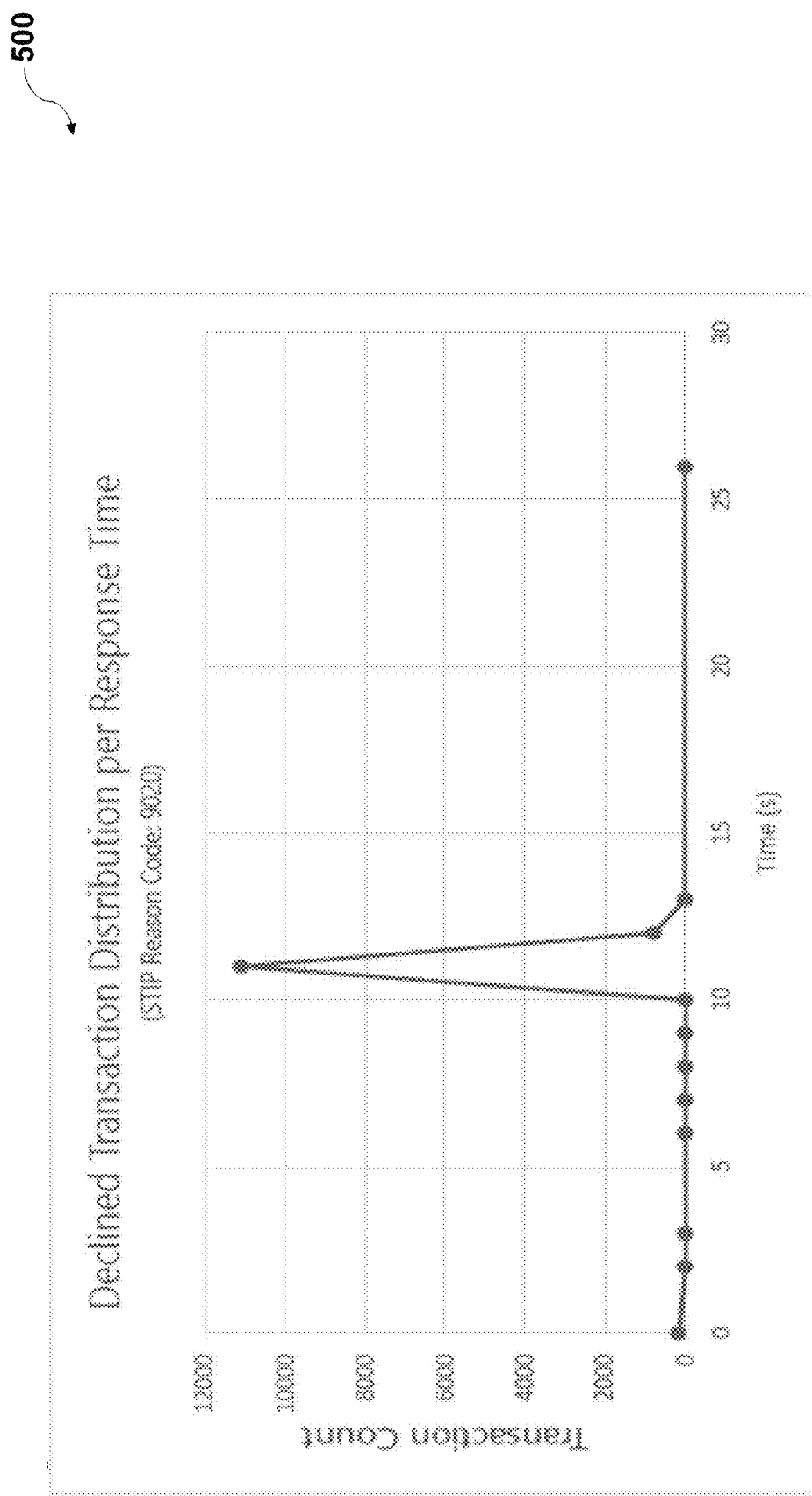
FIG. 5 is a graph showing example authorization response times of an example issuer system for example transactions.

Referring now to FIG. 5, FIG. 5 is a graph 500 showing example authorization response times of an example issuer system for example transactions. As shown in FIG. 5, most authorization responses for the example issuer system were received within a few seconds, and for the remaining authorization responses, response times are distributed over a wide range. For this example, issuer system, for a timeout time set to ten seconds, 0.336% (64,486) of a total number of transactions, had a response time>10 seconds, with a peak distribution around 11 seconds. Each of these transactions (where response time is ten seconds or more) invoked STIP processing due to the timeout time for a response from the issuer system timing out.

An approval rate for a transaction processed using STIP drops by about 20% when compared to normal issuer system approved transactions. A reason for this drop in approval rate is that STIP is a rule-based system, and some issuer systems may have minimal STIP rules, which may lead to higher decline rates for transactions. The number of declines may compound with the addition of more STIP codes across various issuers globally, which may lead to negative customer experiences and/or loss of revenue for members of the electronic payment network.

Because the transaction service provider system applied a static timeout time for the example issuer discussed with respect to FIG. 5, each transaction without an authorization response received from the issuer system resulted in STIP being invoked after ten seconds, which resulted in a lower approval rate. However, as can be seen in FIG. 5, an authorization response was received from the issuer system for most of these STIP transactions within eleven seconds. Using Equation (10), it may be postulated that as long as $t_{TO}$<=110 for the specific merchant/acquirer/terminal provider combination, a transaction may be successfully processed. Accordingly, using a conservative approach, if the transaction service provider system increased the timeout time for this example issuer by 2 seconds, a large portion of the STIP transactions for this issuer system could have been responded to directly by the issuer system without an adverse impact to the electronic payment network.

In this way, a static timeout value for authorization responses from an issuer system, which does not consider real-time processing conditions, may result in increased transaction declines. For example, approval rates for transactions may decrease when an issuer system does not provide a direct authorization response to the transaction service provider system, which may be due to various factors, such as a time delay in sending an authorization response to the transaction service provider system and/or the like.

Issuer systems may have peculiar needs and processes that affect how the issuer systems respond to transactions, and these issuer systems currently abide by static rules that do not take into consideration varying peculiarities of the issuer systems. Although for many years most issuers have obeyed these static rules and transaction service provider systems have been successful with these rules, there is an opportunity for improvement. For example, alternative solutions for issuer systems when the issuer systems fail to meet these rules exist, but these existing solutions are not fully sufficient, thereby creating a gap of declined transactions which, in turn, results in poor customer experience for the cardholder, merchant, and loss of revenue for the members of the electronic payment network.

Provided are improved systems, devices, products, apparatus, and/or methods for dynamic authorization response timeout that receive, from a merchant system, an authorization request associated with a transaction, wherein the authorization request includes transaction data associated with the transaction; communicate the authorization request to an issuer system; in response to communicating the authorization request to the issuer system, initiate a response timer associated with the transaction; in response to the response timer satisfying a predetermined response time amount without receiving, from the issuer system, an authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount; and in response to receiving the authorization response from the issuer system before the response timer satisfies a sum of the extended response time amount and the predetermined response time amount, communicate, to the merchant system, the authorization response, wherein the authorization response includes one of an authorization and a denial of the transaction.

In this way, non-limiting embodiments or aspects of the present disclosure may provide a machine learning/AI based solution that extends an authorization response timeout time for issuer systems using historical response time data to decide on when to extend the timeout time for a transaction, which may enable issuer systems to decide transactions appropriately, increase positive effects on approval rates, reduce a risk of approving fraud related transactions, and/or improve cardholder experience. Accordingly, non-limiting embodiments or aspects of the present disclosure may solve a technical problem of static time rules that apply to each issuer system in a region in a manner that accommodates a uniqueness of each issuer in responding to authorization requests, as well as reduce a processing time for providing a dynamic response time by only determining the dynamic response time after a static timer has expired, where the dynamic response time itself enables reducing a number of Stand-in Processing (STIP) transactions with minimal or reduced impact to overall transaction processing times in an electronic payment network.

Referring now to FIG. 1, FIG. 1 is diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. For example, merchant system 102 may include a computing device, such as a server (e.g., server computer 120, etc.), a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, server computer 120, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server (e.g., server computer 120, etc.), a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like.

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
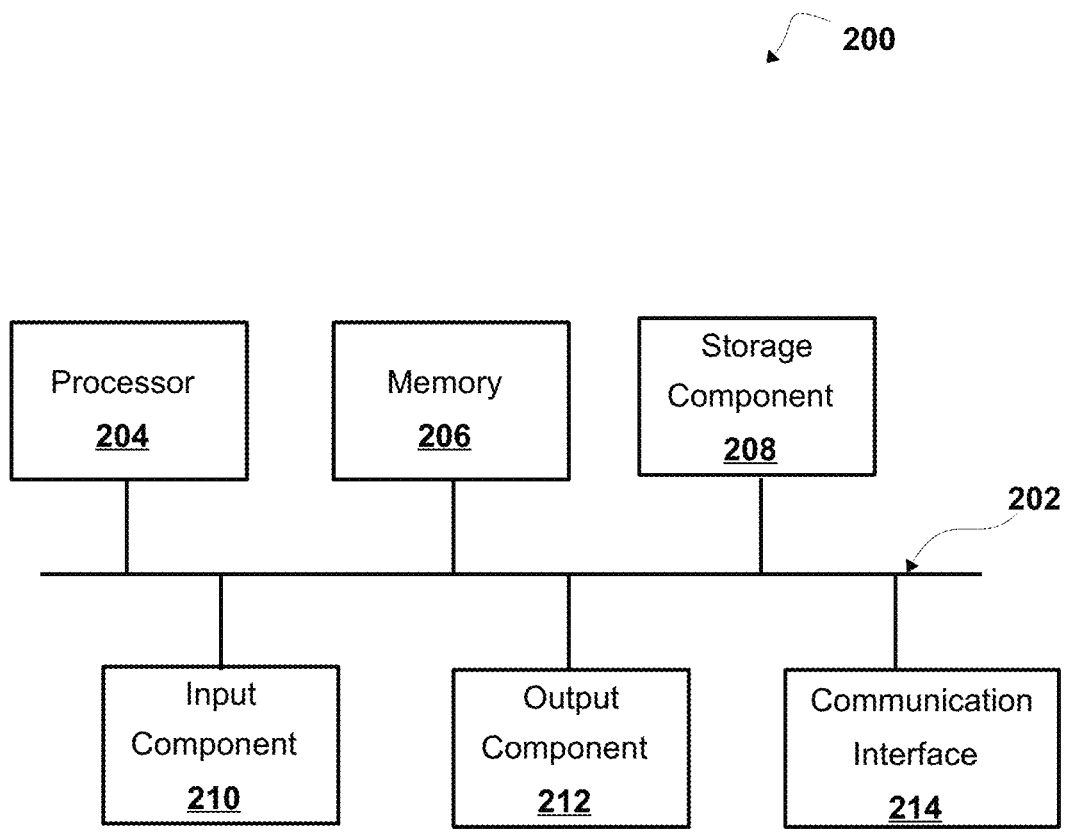
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
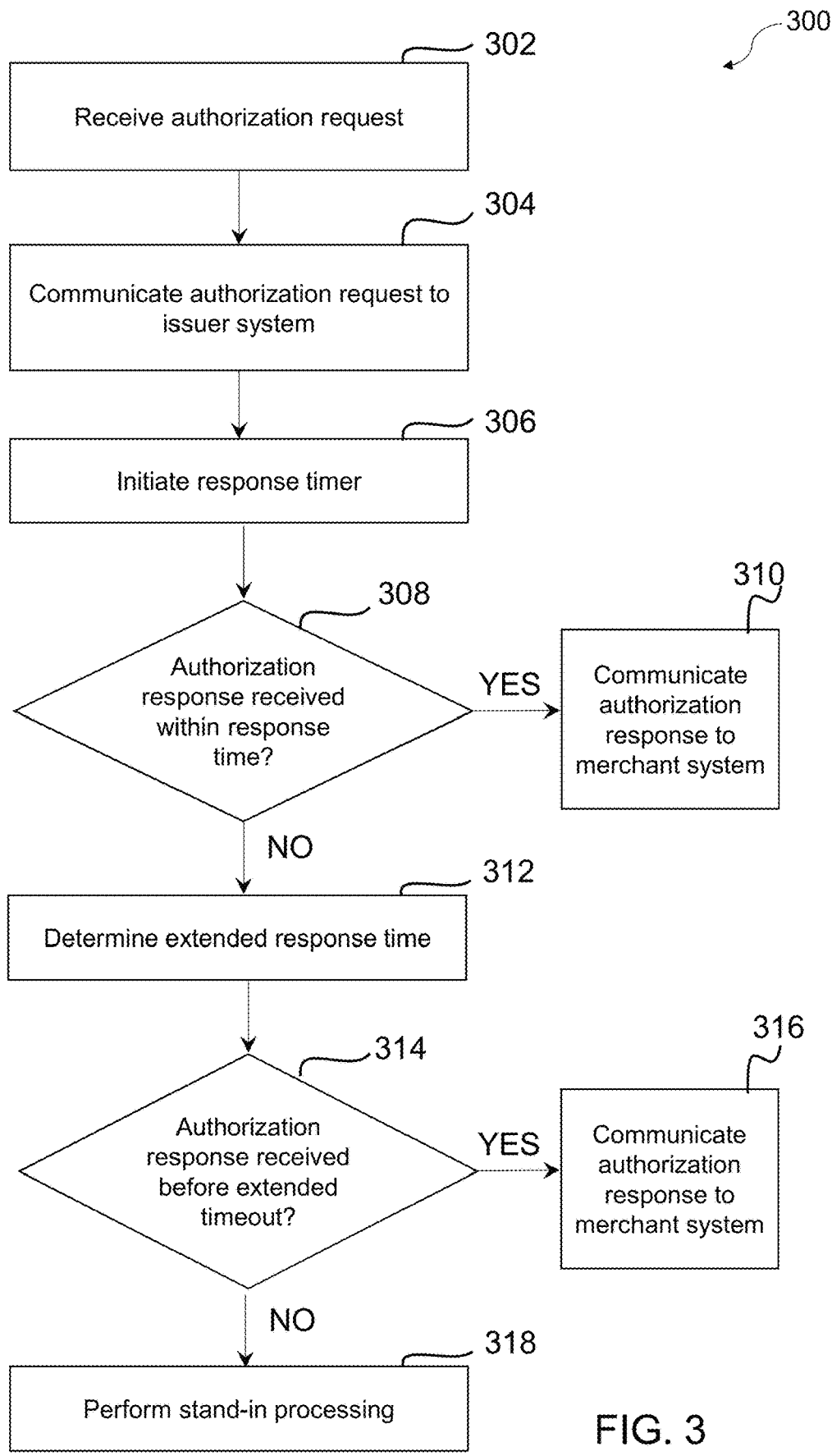
FIG. 3 is a flowchart of non-limiting embodiments or aspects of a process for dynamic authorization response timeout.

Referring now to FIG. 3, FIG. 3 is a flowchart of non-limiting embodiments or aspects of a process 300 for dynamic authorization response timeout. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102, etc.), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes receiving an authorization request. For example, transaction service provider system 108 may receive, from merchant system 102, an authorization request associated with a transaction, the authorization request including transaction data associated with the transaction.

Transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a merchant category group (MCG), a merchant category code (MCC), a type of a point-of-sale (POS) terminal associated with merchant system 102, a type of merchant associated with merchant system 102, a country associated with merchant system 102, a country associated with issuer system 110, a season, a time of day, a processing code, or any combination thereof.

Figure 4:
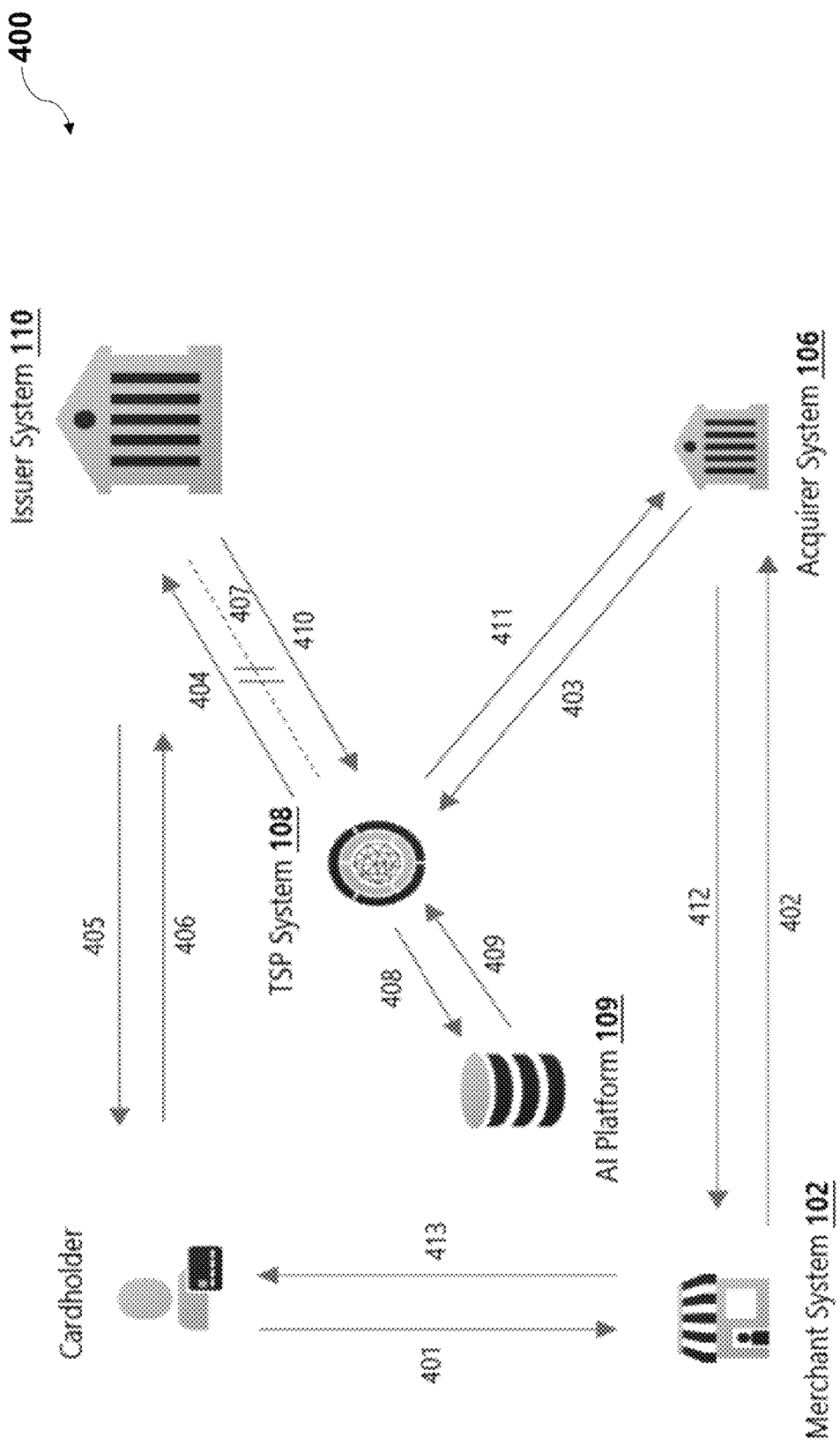
FIG. 4 is a flow diagram of an implementation of non-limiting embodiments or aspects of a process for dynamic authorization response timeout.

Referring also to FIG. 4, FIG. 4 is a flow diagram of an implementation 400 of non-limiting embodiments or aspects of a process 300 for dynamic authorization response timeout. As shown in FIG. 4, at reference number 401, merchant system 102 may receive an account identifier (e.g., a PAN, etc.) and/or other information associated with a payment device from a user (e.g., a cardholder, etc.). At reference number 402, merchant system 102 may communicate the authorization request to acquirer system 106. At reference number 403, transaction service provider system 108 may receive the authorization request from acquirer system 106.

As shown in FIG. 3, at step 304, process 300 includes communicating an authorization request to an issuer system. For example, transaction service provider system 108 may communicate the authorization request to issuer system 110. As an example, issuer system 110 may be identified by the transaction data (e.g., a PAN, a BIN, etc.). For example, and referring again to FIG. 4, at reference number 404, transaction service provider system 108 may transmit and/or forward the authorization request to issuer system 110.

As shown in FIG. 3, at step 306, process 300 includes initiating a response timer. For example, transaction service provider system 108 may, in response to communicating the authorization request to the issuer system, initiate a response timer associated with the transaction. As an example, the response timer may be configured with a static or predetermined timeout value.

Referring again to FIG. 4, at reference number 405, in response to receiving the authorization request, issuer system 110 may query an account associated with the cardholder and, at reference number 406, may bill the cardholder.

As shown in FIG. 3, at step 308, process 300 includes determining whether an authorization response is received within a response time. For example, transaction service provider system 108 may determine whether an authorization response associated with the authorization request is received from issuer system 110 before the response timer satisfies a predetermined response time amount (e.g., before the response timer times out, etc.).

As shown in FIG. 3, if at step 308, process 300 determines an authorization response is received within a response time, at step 310, process 300 includes communicating an authorization response to a merchant system. For example, transaction service provider system 108 may, in response to receiving, from issuer system 110, the authorization response associated with the authorization request before the response timer satisfies the predetermined response time amount (e.g., before the response timer times out, etc.), communicate the authorization response to the issuer system 110.

As shown in FIG. 3, if at step 308, process 300 determines an authorization response is not received within a response time, at step 312, process 300 includes determining an extended response time. For example, transaction service provider system 108 may, in response to the response timer satisfying a predetermined response time amount (e.g., in response to the response timer timing out, etc.) without receiving, from issuer system 110, an authorization response associated with the authorization request, determine an extended response time amount associated with the transaction. As an example, transaction service provider system 108 may determine the extended response time amount associated with the transaction by providing, as input to a machine learning model, the transaction data associated with the transaction and historical transaction data associated with at least one historical transaction associated with the issuer system, and receiving, as output from the machine learning model, the extended response time amount.

Transaction service provider system 108 may generate a machine learning model to predict or generate an extended timeout value for a specific transaction using historical transaction data associated with issuer system 110 (e.g., by predicting or estimating the parameters described in Table 1 herein, etc.) to satisfy Equation (9). For example, transaction service provider system 108 may generate a machine learning model that ensures $STIP(t_R-t_0)<MAX(t_R-t_0)$. In such an example, to for each transaction may be identified by a timestamp included in each incoming message (e.g., authorization request, etc.) received from merchant system 102.

In some non-limiting embodiments or aspects, transaction service provider system 108 may estimate $MAX(t_R-t_0)$ based on testing performed with an individual terminal manufacturer and/or solution provider of a POS terminal and/or solution used by merchant system 102.

In some non-limiting embodiments or aspects, transaction service provider system 108 may estimate $MAX(t_R-t_0)$ based on a rule or assumption that a payment terminal generates a reversal transaction if an original authorization transaction response is not received, and that the issuer, upon receiving the reversal, updates the account balance (if the authorization is approved) or ignores the reversal (if the authorization is declined), which ensures that the cardholder has access to correct available balance. Using this rule or assumption, transaction service provider system 108 may determine that a reversal transit time A is equal to a time when the reversal is received by transaction service provider system 108 minus the reversal origination ($t_0$), and that a time between reversal and authorization B is equal to the reversal origination ($t_0$) minus the authorization origination ($t_0$). Therefore, a terminal timeout value may be equal to B minus A, and MAX($t_R-t_0$) may be estimated based on the observed distribution of B minus A at a terminal level.

Transaction service provider system 108 may estimate $STIP(t_R-t_0)$ according to the following Equation (11):

$$ATR(t_R-t_0)=2t_{MA}+2t_A+2t_{AV}+2t_V+t_{TO} \tag{11}$$

where C=to $t_{MA}+t_A+t_{AV}$, which is equal to the time at which the authorization response is received by transaction service provider system 108 minus the authorization origination ($t_0$), and where D=$t_V$, such that Equation (11) may be rewritten as the following Equation (12):

$$2C+D+t_{TO}<B-A \tag{12}$$

Accordingly, because transaction service provider system 108 may estimate A, B, C, and D with high accuracy (and may update the estimation dynamically based on real-time processing conditions), transaction service provider system 108 may estimate a maximum value $t_{TO}$ at a transaction level with high accuracy.

Transaction service provider system 108 may determine when to extend the response timer over or past the static or predetermined timeout value (e.g., over 10 seconds, etc.). For example, if the response timer is extended for each transaction, there is a processing impact on a speed of transactions, as well as a consumer experience issue (e.g., no consumer wants to wait for 110 seconds for a card payment to complete, etc.). As an example, transaction service provider system may estimate, based on a historical pattern associated with issuer system 110 in historical transaction data associated with at least one historical transaction (e.g., a historical pattern of transaction type, country, current conditions, etc.), how long it typically takes for issuer system 110 to provide an authorization response for these types of transactions (e.g., estimate an average E, etc.). As long as E is less than the calculated to, transaction service provider system 108 may extend the response timer. For example, a sum of a predetermined response time amount of the response timer and the extended response time amount may be less than a time amount of a merchant timeout in response to expiration of which merchant system 102 may cancel the transaction.

Historical transaction data may include at least one of the following parameters associated with at least one historical transaction: a total transit and processing time $t_R$-$t_0$ for a transaction; a transit time of an authorization request from merchant system 102 to acquirer system 106 $t_{MA}$; a processing time of the authorization request at acquirer system 106 $t_A$; a transit time of the authorization request from acquirer system 106 to transaction service provider system 108 $t_{AV}$; a processing time of the authorization request at transaction service provider system 108 $t_V$; a transit time of the authorization request from transaction service provider system 108 to issuer system 110 $t_V$; a processing time of the authorization request at issuer system 110 $t_I$; a transit time of an authorization response from issuer system 110 to transaction service provider system 108 $t_{AV}$; a processing time of the authorization response at transaction service provider system 108 $t_V$; a transit time of the authorization response from transaction service provider system 108 to acquirer system 106 $t_{AV}$; a processing time of the authorization response at acquirer system 106 $t_A$; a transit time from acquirer system 106 to merchant system 102 $t_{MA}$; a total transit and processing time STIP($t_R$-$t_0$) for a transaction in which STIP is invoked; a timeout time associated with issuer system $t_{TO}$; a STIP processing time at transaction service provider system 108 $t_V$; an account identifier (e.g., a PAN, etc.); a transaction amount; a transaction date and time; a type of products and/or services associated with the transaction; a conversion rate of currency; a type of currency; a merchant type; a merchant name; a merchant location; a merchant category group (MCG); a merchant category code (MCC); a type of a point-of-sale (POS) terminal associated with merchant system 102; a type of merchant associated with merchant system 102; a country associated with merchant system 102; a country associated with issuer system 110; a season; a time of day; a processing code; or any combination thereof.

Transaction service provider system 108 may generate the machine learning model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, deep neural networks, LSTMs, etc.), Bayesian statistics, learning automata, Hidden Markov Modeling, linear classifiers, quadratic classifiers, association rule learning, and/or the like. The machine learning model may be trained to provide an output, including an extended response time amount associated with a transaction (e.g., an amount of time to extend a response timer, etc.) in response to input including transaction data associated with the transaction (e.g., one or more parameters of the transaction, etc.) and/or historical transaction data associated with at least one historical transaction associated with issuer system 110 (e.g., one or more parameters of the at least one historical transaction, etc.). For example, transaction service provider system 108 may train the model based on training data (e.g., training transactions, historical transactions, etc.) associated with one or more training transactions and/or one or more historical training transactions. In such an example, an extended response time may include a probability score associated with the extended response time. For example, the extended response time may include a probability that an authorization response is received from issuer system 110 within the extended response time.

In some non-limiting embodiments or aspects, transaction service provider system 108 may store the model (e.g., store the model for later use). In some non-limiting embodiments or aspects, transaction service provider system 108 may store the model in a data structure (e.g., a database, a linked list, a tree, etc.). In some non-limiting embodiments or aspects, the data structure is located within transaction service provider system 108 or external (e.g., remote from) transaction service provider system 108 (e.g., within AI platform 109 as shown in FIG. 4, etc.).

As an example, and referring again to FIG. 4, at reference number 407, the response timer associated with issuer system 110 may elapse without transaction service provider system 108 receiving the authorization response from issuer system 110. At reference number 408, transaction service provider system 108 may call AI platform 109 (e.g., if issuer system 110 is verified as eligible for an extended response time, etc.) to request an extended response time amount for the transaction. At reference number 409, AI platform 109 may provide a response to transaction service provider system 108 stating whether issuer system 110 is eligible for extension and a duration of the extension to be granted. For example, when an authorization request is routed through transaction service provider system 108, transaction service provider system 108 may set or initiate the response timer, and if issuer system 110 does not respond within the specified time limit of the response timer, transaction service provider system 108 may send a query to AI platform 109 for a recommendation, and, at reference number 409, AI platform 109 may respond with a message to transaction service provider system 108 stating if issuer system 110 is eligible for extension and if eligible, the duration of the extension. In such an example, AI platform 109 may generate the recommendation by processing, with the machine learning model, the transaction data associated with the transaction and/or the historical transaction data associated with issuer system 110, such as a historical response pattern of issuer system 110 to any one or any combination of the transaction parameters. In some non-limiting embodiments or aspects, transaction service provider system 108 may, before calling AI platform 109, verify that the issuer system is eligible (e.g., participates in, is subscribed to a program for, etc.) for an extended response time (e.g., by using a look-up table based on an issuer BIN, etc.).

Still referring to FIG. 4, at reference number 410, transaction service provider system 108 may extend the response time for issuer system 110. In such an example, the extension time may be determined by a limiting factor where a sum of the predetermined response time amount and the extended response time amount is less than a time amount of a merchant timeout in response to expiration of which the merchant system cancels the transaction. Although shown as external (e.g., remote from) transaction service provider system 108 in FIG. 4, AI platform 109 may be included within and/or implemented by transaction service provider system 108.

As shown in FIG. 3, at step 314, process 300 includes determining whether an authorization response is received within an extended response time. For example, transaction service provider system 108 may determine whether an authorization response is received from issuer system 110 within the extended response time (e.g., before the response timer satisfies a sum of the extended response time amount and the predetermined response time amount, etc.).

As shown in FIG. 3, if at step 314, process 300 determines an authorization response is received within an extended response time, at step 316, process 300 includes communicating an authorization response to a merchant system. For example, transaction service provider system 108 may, in response to receiving the authorization response from issuer system 110 before the response timer satisfies a sum of the extended response time amount and the predetermined response time amount, communicate, to merchant system 102, the authorization response. In such an example, the authorization response may include one of an authorization and a denial of the transaction. As an example, and referring again to FIG. 4, at reference number 411, transaction service provider system 108 may transmit or forward the authorization response received from issuer system 110 within the extended response time to acquirer system 106 and, at reference number 412, acquirer system 106 may transmit or forward the authorization response to merchant system 102. At reference number 413, merchant system 102 may finalize an exchange of goods and/or services between the merchant and the cardholder.

As shown in FIG. 3, if at step 314, process 300 determines an authorization response is not received within an extended response time, at step 318, process 300 includes performing stand-in processing. For example, transaction service provider system 108 may, in response to the response timer satisfying a sum of the extended response time amount and the predetermined response time amount before receiving the authorization response from issuer system 110, perform a stand-in processing operation by generating, based on the transaction data and at least one rule associated with the issuer system, a stand-in response and communicate, to merchant system 102, the stand-in response. In such an example, the stand-in response may include one of an authorization and a denial of the transaction.

Accordingly, non-limiting embodiments or aspects of the present disclosure may enable issuer systems to directly decide (e.g., authorize, deny, etc.) transactions appropriately and by extension, reduce a risk of declining cardholder transactions in an event that an authorization response is delayed, as well as increase approval rates for issuers which increases interchange fee earnings. Non-limiting embodiments or aspects of the present disclosure may also help an issuer reduce fraud risk and maximize a customer experience for their cardholders.

Further, non-limiting embodiments or aspects of the present disclosure may enable merchants to complete a sale and reduce a risk of fraudulent transactions at the point of sale, and/or promote a positive card experience for cardholders and/or reduce the occurrence of negative customer experiences related to declined transactions during STIP.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
receiving, with at least one processor of a transaction service provider system, from a merchant system, an authorization request associated with a transaction in an electronic payment network, wherein the authorization request includes transaction data associated with the transaction, and wherein the transaction data includes an authorization origination time $t_0$ at which the authorization request is originated at the merchant system;
communicating, with the at least one processor of the transaction service provider system, the authorization request to an issuer system;
in response to communicating the authorization request to the issuer system, initiating, with the at least one processor of the transaction service provider system, a response timer associated with the transaction;
determining, with the at least one processor of the transaction service provider system, that the response timer satisfies a predetermined response time amount without receiving, from the issuer system, an authorization response associated with the authorization request;
in response to determining that the response timer satisfies the predetermined response time amount without receiving, from the issuer system, the authorization response associated with the authorization request, determining, with the at least one processor of the transaction service provider system, an extended response time amount associated with the transaction by providing, as input to a machine learning model, the transaction data associated with the transaction and historical transaction data associated with at least one historical transaction associated with the issuer system, and receiving, as output from the machine learning model, the extended response time amount, wherein the historical transaction data includes at least one transit and processing time associated with the at least one historical transaction with the issuer system, and wherein the machine learning model provides the extended response time amount to ensure that an estimated total transit and processing time $STIP(t_R\text{-}t_0)$ for the transaction if stand-in processing (STIP) is invoked is less than an estimated maximum total transit and processing time $MAX(t_R\text{-}t_0)$ for the transaction if the transaction is successfully processed with or without invoking STIP;

after determining that the response timer satisfies the predetermined response time amount without receiving, from the issuer system, the authorization response associated with the authorization request, receiving, with the at least one processor of the transaction service provider system, the authorization response from the issuer system before the response timer satisfies a sum of the extended response time amount and the predetermined response time amount, wherein the sum of the predetermined response time amount and the extended response time amount is less than a time amount of a merchant timeout in response to expiration of which the merchant system cancels the transaction in the electronic payment network; and in response to receiving the authorization response from the issuer system before the response timer satisfies the sum of the extended response time amount and the predetermined response time amount, communicating, with the at least one processor of the transaction service provider system, to the merchant system, the authorization response, wherein the authorization response includes one of an authorization and a denial of the transaction in the electronic payment network.

2. The computer-implemented method of claim 1, wherein the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

3. The computer-implemented method of claim 1, further comprising:
before determining the extended response time amount, verifying, with the at least one processor of the transaction service provider system, that the issuer system is eligible for an extended response time.

4. The method of claim 1, wherein the estimated maximum total transit and processing time $MAX(t_R-t_0)$ for the transaction if the transaction is successfully processed with or without invoking STIP is estimated based on an observed distribution of B minus A associated with the at least one historical transaction with the issuer system, and wherein, for the at least one historical transaction, A is a reversal transit time equal to a time when a reversal is received by the transaction service provider system minus a reversal origination time, and B is a time between the reversal and authorization equal to the reversal origination time minus the authorization origination time.

5. The method of claim 4, wherein the machine learning model provides the extended response time amount to ensure that an estimated total transit and processing time $STIP(t_R-t_0)$ for the transaction if STIP is invoked is less than an estimated maximum total transit and processing time $MAX(t_R-t_0)$ for the transaction if the transaction is successfully processed with or without invoking STIP according to the following Equation:

$$2C+D+t_{TO}<B-A \quad (12)$$

where C=to $t_{MA}+t_A+t_{AV}$, which is equal to a time at which the authorization response is received by the transaction service provider system minus the authorization origination time ($t_0$), D=$t_V$, $t_{MA}$ is a network travel time between the merchant system and an acquirer system, $t_{AV}$ is a network travel time between the acquirer system and the transaction service provider system, $t_{VI}$ is a network ravel time between the transaction service provider system and the issuer system, $t_A$ is a processing time at the acquirer system for $t_V$ is a processing time at the transaction service provider system, $t_I$ is a processing time at the issuer system, and $t_{TO}$ is a STIP timeout value for the issuer system.

6. A system, comprising:
at least one processor of a transaction service provider system programmed and/or configured to:
receive, from a merchant system, an authorization request associated with a transaction in an electronic payment network, wherein the authorization request includes transaction data associated with the transaction, and wherein the transaction data includes an authorization origination time $t_0$ at which the authorization request is originated at the merchant system;
communicate the authorization request to an issuer system;
in response to communicating the authorization request to the issuer system, initiate a response timer associated with the transaction;
determine that the response timer satisfies a predetermined response time amount without receiving, from the issuer system, an authorization response associated with the authorization request;
in response to determining that the response timer satisfies the predetermined response time amount without receiving, from the issuer system, the authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount, wherein the historical transaction data includes at least one transit and processing time associated with the at least one historical transaction with the issuer system, and wherein the machine learning model provides the extended response time amount to ensure that an estimated total transit and processing time $STIP(t_R-t_0)$ for the transaction if stand-in processing (STIP) is invoked is less than an estimated maximum total transit and processing time $MAX(t_R-t_0)$ for the transaction if the transaction is successfully processed with or without invoking STIP;
after determining that the response timer satisfies the predetermined response time amount without receiving, from the issuer system, the authorization response associated with the authorization request, receive the authorization response from the issuer system before the response timer satisfies a sum of the extended response time amount and the predetermined response time amount, wherein the sum of the predetermined response time amount and the extended response time amount is less than a time amount of a merchant timeout in response to expiration of which the merchant system cancels the transaction in the electronic payment network; and
in response to receiving the authorization response from the issuer system before the response timer satisfies the sum of the extended response time amount and the predetermined response time amount, communicate, to the merchant system, the authorization response, wherein the authorization response includes one of an authorization and a denial of the transaction in the electronic payment network.

7. The system of claim 6, wherein the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

8. The system of claim 6, wherein the at least one processor of the transaction service provider system is further programmed and/or configured to:
before determining the extended response time amount, verify that the issuer system is eligible for an extended response time.

9. A computer program product comprising at least one non-transitory computer-readable medium including program instructions that, when executed by at least one processor of a transaction service provider system, cause the at least one processor of the transaction service provider system to:
receive, from a merchant system, an authorization request associated with a transaction in an electronic payment network, wherein the authorization request includes transaction data associated with the transaction, and wherein the transaction data includes an authorization origination time $t_0$ at which the authorization request is originated at the merchant system;
communicate the authorization request to an issuer system;
in response to communicating the authorization request to the issuer system, initiate a response timer associated with the transaction;
determine that the response timer satisfies a predetermined response time amount without receiving, from the issuer system, an authorization response associated with the authorization request;
in response to determining that the response timer satisfies the predetermined response time amount without receiving, from the issuer system, the authorization response associated with the authorization request, determine an extended response time amount associated with the transaction by providing, as input to a machine learning model, the transaction data associated with the transaction and historical transaction data associated with at least one historical transaction associated with the issuer system, and receiving, as output from the machine learning model, the extended response time amount, wherein the historical transaction data includes at least one transit and processing time associated with the at least one historical transaction with the issuer system, and wherein the machine learning model provides the extended response time amount to ensure that an estimated total transit and processing time STIP($t_R$-$t_0$) for the transaction if stand-in processing (STIP) is invoked is less than an estimated maximum total transit and processing time MAX ($t_R$-$t_0$) for the transaction if the transaction is successfully processed with or without invoking STIP;
after determining that the response timer satisfies the predetermined response time amount without receiving, from the issuer system, the authorization response associated with the authorization request, receive the authorization response from the issuer system before the response timer satisfies a sum of the extended response time amount and the predetermined response time amount, wherein the sum of the predetermined response time amount and the extended response time amount is less than a time amount of a merchant timeout in response to expiration of which the merchant system cancels the transaction in the electronic payment network; and
in response to receiving the authorization response from the issuer system before the response timer satisfies the sum of the extended response time amount and the predetermined response time amount, communicate, to the merchant system, the authorization response, wherein the authorization response includes one of an authorization and a denial of the transaction in the electronic payment network.

10. The computer program product of claim 9, wherein the transaction data includes at least one of the following parameters: a type of a point-of-sale (POS) terminal associated with the merchant system; a type of merchant associated with the merchant system; a country associated with the merchant system; a country associated with the issuer system; a merchant category code (MCC); a season; a time of day; or any combination thereof.

* * * * *